United States Patent Office 2,796,381
Patented June 18, 1957

2,796,381

REPOSITORY VEGETABLE OIL, ETHYL CELLULOSE, TETRACYCLINE-TYPE ANTIBIOTIC COMPOSITION

Wilbur Ryder Borst, West Lafayette, Ind., assignor to American Cyanamid Company, New York, N. Y., a corporation of Maine No Drawing. Application June 22, 1955,
Serial No. 517,383

5 Claims. (Cl. 167—82)

This invention relates to a repository base suitable as a liquid carrier for antibiotics for parenteral injections, as well as topical application, and a method of preparing the same. This application is a continuation-in-part of application Serial No. 168,663, filed June 16, 1950, now abandoned.

The intramuscular route is preferred for the administration of many therapeutic agents. Desirably the rate of release of the agent is controlled. A patent to Welch, 2,491,537, "Liquid Injectable Oil-Pectin-Drug Therapeutic Compositions," describes certain advantages of a delayed release. A patent to Libby, 2,449,039, "Therapeutic Composition," teaches the suspension of penicillin particles in digestible glycerides, such as corn oil, and mentions ethyl cellulose as among agents that may be present.

It has now been found that by heating ethyl cellulose in a vegetable oil, within the range of 180 to 205° C., cooling, and suspending a therapeutic agent such as one of the tetracyclines in the thickened oil, an excellent repository base is obtained.

My new repository base is sufficiently thick as to eliminate the settling out of powdered drug suspensions, is easy to use, is convenient to prepare, readily permits the formation of a uniform suspension, and provides an anhydrous repository base particularly suitable for water-sensitive drugs. Additionally, it is chemically inert, non-freezing, has but slight change in viscosity with temperature, and is usable over a wide temperature range.

Methocel, that is methyl cellulose, hydroxy-ethyl-cellulose and carboxy-methyl-cellulose do not dissolve in the oil but decompose. Ethocel alone is soluble. By dissolving up to 5% of ethocel in a vegetable oil such as corn oil at a temperature within the range of approximately 180 to 205° C., preferably within the range of 195 to 200° C., there is formed a smooth viscous oil in which the medicament may be dissolved or suspended. If temperatures of much above 205° C. are used, the oil-ethocel mix darkens. If a temperature much below 180° C. is used, the ethocel does not completely dissolve and the product tends to be stringy and may contain bubbles. Of course, a longer period at a somewhat lower temperature may be used. The ethyl-cellulose used may be esterified to a greater or lesser degree, which, of course, affects the viscosity characteristics of the product.

The grade of ethyl-cellulose known as 100 centipoise is very satisfactory for my purpose. (Note Henry A. Gardner, "Examination of Paints," or A. S. T. M. specifications on viscosity.) With the lower viscosity ethers, more ethyl-cellulose may be dissolved. With the 100 cp. product, approximately 5% of ethyl-cellulose will cause the mix to gel to a solid mix which is thixotropic which, of course, is highly advantageous for the preparation of an injectable repository base.

My product may be used as a repository base for drugs which are soluble in it or for drugs which are suspendable in it. In the base, drugs normally have a longer period of therapeutic effectiveness than the same drug injected in water. The period of therapeutic activity may be additionally prolonged by dissolving epinephrine in the mix. The drug may be suspended in the repository base after it has cooled to a sufficiently low temperature as not to be damaging to the drug. Procaine penicillin, for instance, is damaged if heated above about 56° C. For exceptionally stable drugs, it may, of course, be mixed while hot. Among the many drugs that may be used are epinephrine, benzestrol, novocaine, d-tubocurarine, digitalis, alkali salts of penicillin, amine salts of penicillin such as procaine penicillin, cyclohexylguanylurea salts of penicillin, chlortetracycline, tetracycline, bromotetracycline and their salts, such as the hydrochlorides, sulfates, or calcium salt and mixtures of such products. Corn oil is very satisfactory but other vegetable oils such as peanut oil, sesame oil, rape seed oil, poppy seed oil, and cotton seed oil all form excellent injection bases.

The repository base is not subject to freezing nor separation under storage conditions. Its viscosity is substantially constant over normal working ranges, including freezing weather. It is chemically unreactive under all normal conditions.

Tocopherol may be added to aid stability. The glyceride oils may oxidize slowly, and an antioxidant such as tocopherol or butylated hydroxyanisol gives added time stability. Compound F, hydrocortisone alcohol, may be added to reduce inflammation.

The gelled base containing the antibiotics also may be used topically, including treatment of ophthalmic conditions, or may be injected into an animal's udder as a mastitis treatment. The comparatively slight change in viscosity with temperature of this base makes the preparation particularly effective for use as a mastitis ointment in cold weather.

As examples of certain types of drugs and conditions, but not by way of limitation, the following examples are given.

Example 1

A repository base mixture was prepared from 100 cc. of corn oil and 1 gram of ethyl cellulose, 100 cp., by mixing, then heated with stirring to 195° C. The mixture was stirred until clear and bubble-free, and cooled. After cooling, 300,000 units of crystalline procaine penicillin G and 100,000 units of crystalline potassium penicillin G were made up to a volume of 1 cc. with the base, all under sterile conditions; the mixture stirred until uniformly suspended; and the penicillin in the repository base was injected into the hip muscle. The product was easily syringable and exhibited no untowards effects in the recipient and gave a comparatively stable lasting penicillin blood level.

Example 2

A mixture was prepared containing 100 cc. of corn oil and 2.5 grams of ethyl cellulose, 100 cp., the mixture heated with stirring to 200° C. until the mixture was clear and bubble-free. Twenty grams of chlortetracycline hydrochloride, micronized, were suspended in the mixture after it had cooled, and the product used for intramuscular injection. The product is stable and syringable.

Example 3

A mixture was prepared of 100 cc. of corn oil, 5 grams of ethyl cellulose, 100 cp. grade, the mixture stirred and heated to a temperature of 200° C. until clear and bubble-free. The mixture was cooled, thereby obtaining a clear solidified gel which on shaking became a thick fluid. To 1 cc. of the mixture was added 15 milligrams of micronized sterile chlortetracycline hydrochloride and the mixture found satisfactory for injection.

Example 4

A mixture was prepared containing 100 grams of sesame oil, 5 grams of ethyl cellulose, 25 cp. grade, the mixture stirred with heating to a temperature of 200° C. until clear and bubble-free. The mixture was cooled and thereto added 15 grams of chlortetracycline as the free base. A suspension was obtained suitable for injection.

Example 5

A mixture of 100 cc. rape seed oil and 2½ grams of 100 cp. grade ethyl cellulose was heated to 195° C. and stirred until clear and bubble-free. The mixture was allowed to cool to about 40° C. and thereto added sufficient procaine penicillin G and sodium penicillin G that the resultant mixture contained 300,000 units per cc. of procaine penicillin G and 100,000 units per cc. of sodium penicillin G, under sterile conditions. After mixing and cooling to room temperature, there resulted a viscous injectable material which was easily syringable, was stable, and maintained its potency for a long period.

Example 6

A mixture of 100 cc. cotton seed oil and 2½ grams of 100 cp. grade ethyl cellulose was heated to 200° C. and stirred until clear and bubble-free. The mixture was allowed to cool to about 40° C. and thereto added sufficient procaine penicillin G and sodium penicillin G that the resultant mixture contained 300,000 units per cc. of procaine penicillin G and 100,000 units per cc. of sodium penicillin G. After mixing and cooling to room temperature, there resulted a viscous injectable material which was easily syringable, was stable, and maintained its potency for a long period.

Example 7

To 100 cc. of corn oil was added 2.5 grams of ethyl cellulose, 100 cp. grade, and the mixture heated with stirring at 200° C. until clear and bubble-free. The mixture was cooled and to the gel at approximately room temperature was added sufficient procaine penicillin G and sufficient sodium penicillin G that the resultant mixture contained 300,000 units per cc. of procaine penicillin G and 100,000 units per cc. of sodium penicillin G.

Mixtures of the same therapeutic agents in water and in peanut oil at the same concentrations were prepared and rabbits injected therewith at a dosage level of 0.1 cc. per kilogram. After 48 hours, under strictly comparable conditions, it was found that the rabbits which had been injected with the penicillin in the base prepared in accordance with Example 4 had an average blood level of 0.030 unit, whereas those injected with the penicillin in each of water and peanut oil gave an average of 0.006, both of which values are so low as to be totally inadequate and barely sufficient to show on assay. Indeed, most rabbits gave no blood levels and others only a trace.

Example 8

120 grams of ethyl cellulose, 100 cp. grade, were dissolved in 6,000 cc. of sesame oil by heating to 190° C. The hot solution was strained through 4 layers of cheesecloth, then cooled. To the cooled solution were added 9 grams of mixed tocopherols and the mixture stirred.

To one-half of the oil was added 33 grams of tetracycline hydrochloride and the oil run through a homogenizing mill. The preparation could be used topically, or intramuscularly.

Example 9

To 24,000 cc. of sesame oil were added 500 grams of ethyl cllulose and the mixture heated at 190° C. until the ethyl cellulose had dissolved. The hot solution was strained through 4 layers of cheesecloth and cooled. To the cool solution were added sterilely 50 grams of commercial (34%) tocopherol, 375 grams of Compound F (hydrocortisone alcohol), and 250 grams of chlortetracycline hydrochloride. The mixture was diluted to 24,700 cc. with sesame oil and the composition passed through an ointment mill to disperse and blend the ingredients.

This composition is particularly useful as an eye ointment because the Compound F markedly decreases inflammation. The tocopherols add to the stability of the sesame oil, even though without them the composition is comparatively stable.

Example 10

1,000 cc. of sesame oil were heated to 180° C. and thereto added slowly with stirring 10 grams of ethyl cellulose. When dissolved the mixture was filtered through 6 layers of cheesecloth. The mixture was cooled, ½ gram of "Tenox II" (butylated hydroxyanisol and citric acid) added as an antioxidant. 50 grams of chlortetracycline hydrochloride were added and the mixture under sterile conditions was passed through a colloid mill. The resulting preparation was used for the treatment of psittacosis in parakeets. A single injection of this preparation gave an adequate blood level of chlortetracycline in the birds for 3 days.

Example 11

Example 10 was repeated using tetracycline hydrochloride as the antibiotic. The preparation on injection intramuscularly gave an adequate blood level in parakeets for 3 days.

Example 12

A composition was prepared containing 5% of tetracycline hydrochloride in sesame oil without the ethylcellulose. When injected under comparable conditions, due provisions being taken to insure that the antibiotic remainded suspended in the oil, it was found that the blood level in the parakeets had dropped below a useful level in less than 24 hours.

Example 13

To a 1% ethyl cellulose in sesame oil base prepared as in Example 10, was added per milliliter, 100 milligrams of chlortetracycline hydrochloride and 100 milligrams of neomycin sulfate. This preparation gave a stable composition, with a workable viscosity suitable for bovine mastitis treatment over a wide temperature range. It was particularly advantageous in cold weather as the material could be used immediately for treatment, whereas the older petrolatum based ointments required warming to reduce the viscosity before injection.

Example 14

Procedure of Example 4 was repeated using tetracycline as the free base. The suspension obtained was suitable for injection.

Wide variations in the quantity of ethyl cellulose may be used, depending upon the viscosity of the product desired and the viscosity grade of the ethyl cellulose. The concentration of the drug used in the base may vary within wide limits, being determined by convenience for the user.

I claim:

1. An anhydrous sterile repository composition comprising a vegetable oil, ethyl cellulose, and an antibiotic selected from the group consisting of chlortetracycline, tetracycline, bromotetracycline, and their acid and basic salts, said ethyl cellulose having been dissolved in said vegetable oil at a temperature in the range of 180°–205° C. so as to form a viscous gel in said vegetable oil.

2. The composition of claim 1 in which the antibiotic is chlortetracycline hydrochloride.

3. The composition of claim 1 in which the antibiotic is tetracycline hydrochloride.

4. The composition of claim 1 in which the antibiotic is chlortetracycline as the free base.

5. The composition of claim 1 in which the antibiotic is tetracycline as the free base.

(References on following page)

References Cited in the file of this patent

UNITED STATES PATENTS

| | | |
|---|---|---|
| 1,963,901 | Hickman | June 19, 1934 |
| 2,449,039 | Libby | Sept. 7, 1948 |
| 2,491,537 | Welch | Dec. 20, 1949 |
| 2,507,193 | Buckwalter | May 9, 1950 |

FOREIGN PATENTS

| | | |
|---|---|---|
| 76,311 | Sweden | June 10, 1931 |

OTHER REFERENCES

Am. Prof. Pharm., April 1941, pages 225–227.
Am. Prof. Pharm., May 1941, pages 296–297.